(12) United States Patent
Kvieska et al.

(10) Patent No.: US 12,330,638 B2
(45) Date of Patent: Jun. 17, 2025

(54) METHOD AND DEVICE FOR IMPLEMENTING A CLOSED LOOP OF AN ADVANCED DRIVING AID DEVICE

(71) Applicant: RENAULT s.a.s, Boulogne-Billancourt (FR)

(72) Inventors: Pedro Kvieska, Versailles (FR); Simon Mustaki, Paris (FR); Francois Fauvel, Boullay les Troux (FR); Philippe Chevrel, Carquefou (FR); Mohamed Yagoubi, Nantes (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 773 days.

(21) Appl. No.: 17/251,080

(22) PCT Filed: May 28, 2019

(86) PCT No.: PCT/EP2019/063868
§ 371 (c)(1),
(2) Date: Dec. 10, 2020

(87) PCT Pub. No.: WO2019/238418
PCT Pub. Date: Dec. 19, 2019

(65) Prior Publication Data
US 2021/0323551 A1    Oct. 21, 2021

(30) Foreign Application Priority Data
Jun. 11, 2018   (FR) ...................................... 18 55071

(51) Int. Cl.
*B60W 30/12*   (2020.01)
*B60W 60/00*   (2020.01)

(52) U.S. Cl.
CPC ........ *B60W 30/12* (2013.01); *B60W 60/0015* (2020.02); *B60W 2552/53* (2020.02); *B60W 2554/4026* (2020.02)

(58) Field of Classification Search
CPC ............. B60W 30/12; B60W 60/0015; B60W 2554/402; B60W 2552/53; B60W 10/20;
(Continued)

(56) References Cited

U.S. PATENT DOCUMENTS 5,432,700 A * 7/1995 Hrovat ............... B60G 17/0165
                                                  280/5.515
5,439,245 A * 8/1995 Breitenbacher ........ B60G 17/08
                                                  280/5.518
(Continued)

FOREIGN PATENT DOCUMENTS

FR    3 040 349 A1    3/2017
WO    WO 2017/203159 A1    11/2017

OTHER PUBLICATIONS

Chilali, "H∞ Design with Pole Placement Constraints: An LMI Approach", 1996 (Year: 1996).*
(Continued)

*Primary Examiner* — Isaac G Smith
*Assistant Examiner* — Christopher George Fees
(74) *Attorney, Agent, or Firm* — Oblon, McClelland, Maier & Neustadt, L.L.P.

(57) ABSTRACT

A method for implementing a closed loop of an advanced driving aid device for the lateral control of a motor vehicle includes synthesizing a controller of the closed loop by solving an optimization problem based on a bicycle model of the vehicle. A family of at least two bicycle models of the vehicle is established, these models having, with respect to one another, at least one dispersion chosen from among a dispersion of mass of the vehicle, a dispersion of drift
(Continued)

rigidity on a drivetrain of the vehicle, a dispersion of the center of gravity of the vehicle, and a dispersion of the position of the matrix of inertia of the vehicle, the optimization problem being solved on the basis of all models of the family.

13 Claims, 5 Drawing Sheets

(58) Field of Classification Search
CPC ......... B60W 30/18145; B60W 40/072; B60W 2040/1323; B60W 2050/0005; B60W 2050/0008; B60W 50/0013; B60W 2050/0033; B60W 2050/0095; B60W 2520/12; B60W 2520/14; B60W 2520/20; B60W 2530/10; B60W 2530/20; B60W 2540/18; B60W 2552/30; B60W 2554/4026; B60W 50/0097; B62D 15/025; B60Y 2300/1815
See application file for complete search history.

(56) References Cited

U.S. PATENT DOCUMENTS

| | | | |
|---|---|---|---|
| 5,979,581 A * | 11/1999 | Ravani | G05D 1/024 180/168 |
| 9,227,632 B1 * | 1/2016 | Lee | B60W 30/0956 |
| 9,731,755 B1 * | 8/2017 | Moshchuk | B62D 6/00 |
| 10,836,383 B2 * | 11/2020 | Ersal | B62D 15/0265 |
| 11,644,834 B2 * | 5/2023 | Ditty | G06V 20/588 701/23 |
| 2009/0177346 A1 * | 7/2009 | Hac | B60W 40/13 701/31.4 |
| 2013/0304326 A1 * | 11/2013 | Van Dongen | B60W 30/146 701/1 |
| 2017/0090444 A1 * | 3/2017 | Takahashi | G06F 17/11 |
| 2018/0239327 A1 * | 8/2018 | Yamamoto | G05B 5/01 |
| 2018/0340795 A1 * | 11/2018 | Goupil | G05B 23/0254 |
| 2020/0216085 A1 * | 7/2020 | Bobier-Tiu | B60W 40/08 |
| 2021/0114457 A1 * | 4/2021 | Eberl | B60T 8/175 |
| 2021/0129839 A1 * | 5/2021 | Hultén | B62D 15/025 |

OTHER PUBLICATIONS

Chilali, M. et al., "H∞ Design with Pole Placement Constraints: An LMI Approach," IEEE Transactions on Automatic Control, vol. 41, No. 3, Mar. 1, 1996, XP01100005, pp. 358-367.
International Search Report issued on Jul. 2, 2019 in PCT/EP2019/063868 filed on May 28, 2019, 3 pages.
French Search Report (with translation of categories) issued on Feb. 1, 2019 in French Application No. 18 55071 filed on Jun. 11, 2018, 3 pages.

* cited by examiner

METHOD AND DEVICE FOR IMPLEMENTING A CLOSED LOOP OF AN ADVANCED DRIVING AID DEVICE

The present invention relates to the field of optimization of advanced driver assistance with respect to sideways control of a motor vehicle, and more particularly with respect to centering a motor vehicle in a traffic lane.

Increasingly, motor vehicles are equipped with advanced driver-assistance systems (ADAS). In particular, advanced driver-assistance systems are incorporated into autonomous vehicles with a view to controlling such vehicles.

The function of an advanced driver-assistance system for sideways control of a vehicle is to control a steering wheel in order to act on the sideways position of the vehicle on the roadway. An example of an advanced driver-assistance system for sideways control is a "lane centering assist" or LCA. Such a system controls the steering wheel to keep the vehicle in the center of a traffic lane.

An advanced driver-assistance system for sideways control generally comprises a closed loop and an open-loop term. The closed loop has a slow rate of change, aiming to ensure a good performance level. The open loop aims to ensure a good performance during cornering. The open loop is based on a model that remains the same throughout the life of the vehicle.

With such a design, a gentle control that avoids jerks that could irritate the driver is obtained. However, the slow rate of change of the closed loop means that the system lacks robustness with respect to parametric variations.

In light of the above, the aim of the invention is to increase the robustness of a closed loop delivering advanced driver assistance with respect to sideways control of a motor vehicle.

According to a first aspect, a method for optimizing a closed loop of an advanced driver-assistance system for sideways control of a motor vehicle is provided, wherein a controller of the closed loop is synthesized by solving an optimization problem using a bicycle model of the vehicle.

According to one of the general features of this method, a family of at least two bicycle models of the vehicle having, with respect to one another, at least one dispersion chosen from a dispersion in the mass of the vehicle, a dispersion in the cornering stiffness of an axle assembly of the vehicle, a dispersion in the position of the center of gravity of the vehicle and a dispersion in a moment of inertia of the vehicle is established, the optimization problem being solved using all the models of the family.

Thus, a plurality of models are considered so as to find a single controller allowing a behavior that is uniform and consistent for various configurations of the vehicle to be obtained. Thus, the robustness of the closed loop of an advanced driver-assistance system is increased.

Advantageously, irrespectively of the two models belonging to the family, these models have, with respect to each other, at least one dispersion chosen from a dispersion in the mass of the vehicle, a dispersion in the cornering stiffness of a front axle assembly of the vehicle and a dispersion in the cornering stiffness of a rear axle assembly of the vehicle.

As is explained below, a direct relationship may be established between the mass of the vehicle and the position of the center of gravity of the vehicle. As will be explained below, this relationship allows the dispersion in only one of these two quantities to be considered. The moment of inertia varies very little between the various configurations of the vehicle, in particular when it is a question of compact vehicles. It is therefore possible to exclude a dispersion in the moment of inertia. By accepting this relationship between the position of the center of gravity and mass and/or by excluding a dispersion in the moment of inertia, the number of models to be considered is decreased while preserving a good robustness.

In one mode of implementation, the family comprises a nominal bicycle model corresponding to a configuration of the vehicle transporting exactly two passengers present in the front of the vehicle, the nominal bicycle model employing a nominal mass of the vehicle, a nominal cornering stiffness of the front axle assembly and a nominal cornering stiffness of the rear axle assembly, the family furthermore comprising at least one alternative bicycle model.

A first alternative bicycle model employs a mass of the vehicle equal to the nominal mass of the vehicle, a cornering stiffness of the front axle assembly higher than the nominal cornering stiffness of the front axle assembly and a cornering stiffness of the rear axle assembly higher than the nominal cornering stiffness of the rear axle assembly. This model corresponds to a configuration of the vehicle with a first change in the tires.

A second alternative bicycle model employs a mass of the vehicle equal to the nominal mass of the vehicle, a cornering stiffness of the front axle assembly lower than the nominal cornering stiffness of the front axle assembly and a cornering stiffness of the rear axle assembly lower than the nominal cornering stiffness of the rear axle assembly. This model corresponds to a configuration of the vehicle with a second change in the tires.

A third alternative bicycle model employs a mass of the vehicle higher than the nominal mass of the vehicle, a cornering stiffness of the front axle assembly lower than the nominal cornering stiffness of the front axle assembly and a cornering stiffness of the rear axle assembly higher than the nominal cornering stiffness of the rear axle assembly. This model corresponds to a configuration of the vehicle with an addition of mass and a third change in the tires.

A fourth alternative bicycle model employs a mass of the vehicle higher than the nominal mass of the vehicle, a cornering stiffness of the front axle assembly equal to the nominal cornering stiffness of the front axle assembly and a cornering stiffness of the rear axle assembly higher than the nominal cornering stiffness of the rear axle assembly. This model corresponds to a configuration of the vehicle with an addition of mass and a fourth change in the tires.

As explained below, while preserving the understeer character of the vehicle, the aforementioned nominal and alternative bicycle models represent very different configurations of the vehicle. Now, vehicle chassis are generally constructed to not oversteer. By only selecting bicycle models that preserve an understeer character, realistic models of the overall behavior of the vehicle are privileged.

In one particularly advantageous mode of implementation, the family comprises the nominal bicycle model and the four aforementioned alternative bicycle models. Such a mode of implementation is particularly advantageous in so far as it takes into account five very relevant different configurations, so as to increase as significantly as possible the robustness of the advanced driver-assistance system while limiting the number of models to be considered and so as to add realism to the synthesis in order to decrease untrustworthiness.

Preferably, a road curvature is modelled using a third-order model with a zero initial derivative, an environment model is generated by subjecting the third-order model to an irreducible signal and the optimization problem is solved using the generated environment model.

The high continuity of road curvature makes such a third-order model particularly suitable for generating a disruption scenario such as a road curvature.

Advantageously, the solution of the optimization problem comprises minimizing the norm $\mathcal{H}_2$ of a transfer function between the irreducible signal and a jerkiness in the angle of the steering wheel, while respecting at least one constraint chosen from:

a first constraint taking the form of an upper bound on the norm $\mathcal{H}_2$ of a transfer function between the irreducible signal and a sideways deviation of the center of gravity of the vehicle with respect to the center of a traffic lane of the roadway, and a second constraint taking the form of a lower bound on the inverse of the norm $\mathcal{H}_\infty$ of a sensitivity function of the advanced driver-assistance system.

Synthesis by solving such a problem allows advanced driver assistance that meets the required demands in terms of performance and robustness to be obtained while maximizing the comfort of the driver. On so doing, the acceptance of the advanced driver assistance by the driver, in particular in the context of an autonomous vehicle, is increased.

In one mode of implementation, a region of the complex plane is defined between a maximum real part, two straight half-lines originating at the origin and making a geometric angle to the real axis and a level curve of the modulus, the optimization problem being solved such that, for each model belonging to the family, the poles of the controller are located in said region.

The maximum real part allows a lower bound to be placed on slowest rate of change of the advanced driver-assistance system. The straight half-lines making a geometric angle allow a lower bound to be placed on damping of the advanced driver-assistance system. The level curve of the modulus allows an upper bound to be placed on the highest rate of change of the advanced driver-assistance system. By seeking, for the various models, to locate all the poles in this region, the behavior of the driving system is made more uniform and to conform better with the requirements in the various configurations.

Preferably, a maximum value of a gain of the transfer function of the closed loop is received, the optimization problem being solved such that the maximum value is the upper bound of the gain of the transfer function of the closed loop.

Such an upper bound allows a lack of robustness related to modelling errors and to noise to be avoided, and allows the space to search for the optimization to be decreased and therefore the phase of synthesizing the controller to be accelerated.

In one mode of implementation, the method is intended to optimize an advanced driver-assistance system for centering a motor vehicle in a traffic lane.

According to another aspect, a computer program containing a code configured to, when it is executed by a processor or an electronic control unit, implement the method such as defined above is provided.

According to yet another aspect, a device for optimizing a closed loop of an advanced driver-assistance system for sideways control of a motor vehicle is provided, this device comprising a unit for preparing an optimization problem and a unit for synthesizing a controller by solving a prepared optimization problem.

According to one of the general features of this device, the preparing unit comprises a selecting module configured to select a family of at least two bicycle models of the vehicle having, with respect to one another, at least one dispersion chosen from a dispersion in the mass of the vehicle, a dispersion in the cornering stiffness of an axle assembly of the vehicle, a dispersion in the position of the center of gravity of the vehicle and a dispersion in a moment of inertia of the vehicle, the synthesizing unit being configured to solve the optimization problem using all the models of the family.

Other aims, features and advantages of the invention will become apparent on reading the following description, which is given merely by way of nonlimiting example, and with reference to the appended drawings, in which.

Figure 1:
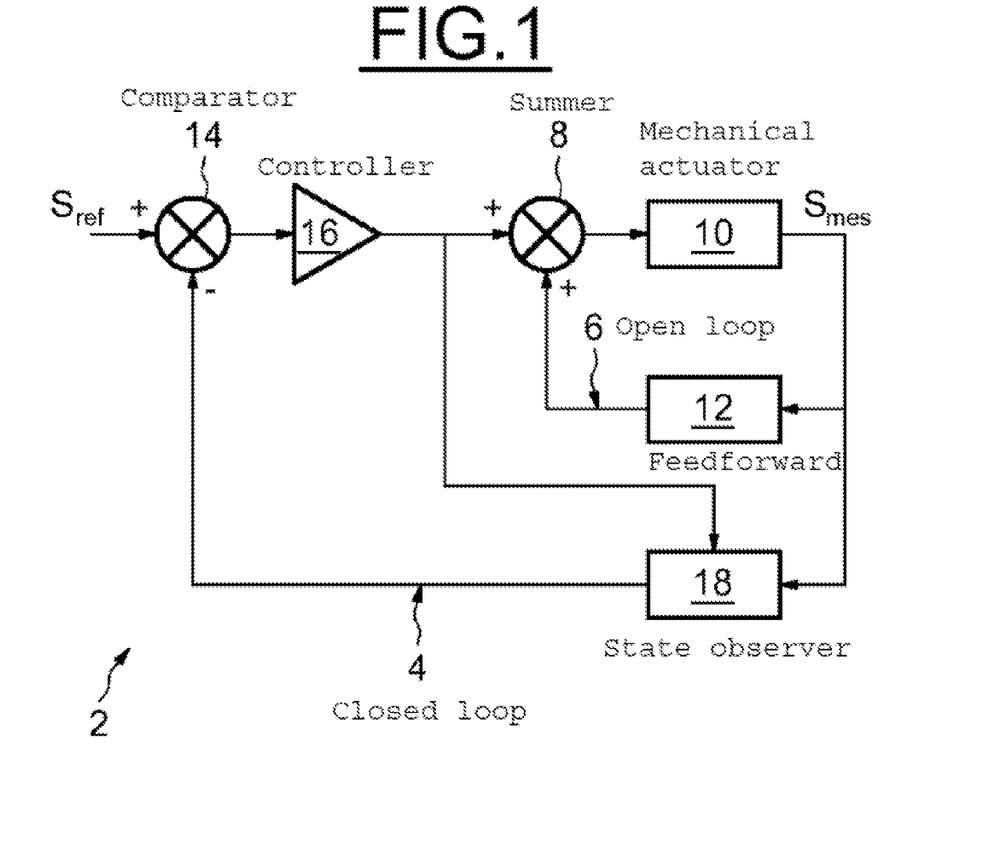
FIG. 1 is a block diagram of an advanced driver-assistance system for sideways control of a motor vehicle, FIG. 2 schematically illustrates an optimizing device according to one aspect of the invention.

With reference to FIG. 1, the topology of an advanced driver-assistance system for sideways control of a motor vehicle has been schematically shown via a block diagram 2. In the illustrated example, the advanced driver assistance is intended to be delivered to an autonomous vehicle. However, it is of course possible, without departing from the scope of the invention, to envision advanced driver assistance intended to be delivered to a vehicle driven by a driver. The system illustrated in FIG. 1 is a system for sideways control with a view to centering the vehicle in a traffic lane. Likewise, this system could equally well deliver advanced driver assistance for a different type of sideways control.

Generally, the block diagram 2 consists of a closed loop 4 and of an open loop 6. The function of the closed loop 4 is to keep the vehicle at the center of a virtual lane considered to always be straight. The open loop 6 accounts for the curvature of the road and compensates for the effect of the bend on the states and the control. The term generated by the open loop 6 is added to the closed loop 4 by means of a summer 8.

The closed loop 4 comprises a comparator 14. A reference signal $S_{ref}$ is delivered to the comparator 14. A controller 16 receives the signal delivered by the comparator 14 and generates a corrected signal, which is delivered to the summer 8. The controller 16 may be parameterized so as to optimize the closed loop 4 in order to improve the properties of the advanced driver assistance delivered to the vehicle.

The closed loop 4 comprises a set 10 corresponding to the various constituent mechanical elements of the advanced driver-assistance system. In the illustrated example, the set 10 especially comprises a mechanical actuator of the advanced driver-assistance system, such as the power steering of the vehicle, the motor vehicle itself and sensors with which the vehicle is equipped. The set 10 delivers a measurement signal $S_{mes}$ resulting from measurement of parameters of the vehicle.

The open loop 6 comprises a feedforward 12. The feedforward 12 receives the signal $S_{mes}$ and delivers an output signal to the summer 8.

The closed loop 4 comprises a state observer 18. The state observer receives the signal $S_{mes}$ and the signal delivered by the controller 16. The state representation employed by the state observer 18 is based on a bicycle model of the vehicle. The corresponding state vector contains the following seven states:

$$x = [\dot{\psi}\, \psi_r\, \dot{y}_L\, y_L\, \dot{\delta}\, \delta\, \textstyle\int y_L]^T$$

where $\dot{\psi}$ is the rate of change of the relative heading angle, $\psi_r$ is the relative heading angle, $\dot{y}_L$ is the sideways velocity of the vehicle, $y_L$ is the sideways deviation of the vehicle, $\dot{\delta}$ is the rate of change of the front-wheel angle, $\delta$ is the front-wheel angle and $\int y_L$ is the integral of the lateral deviation.

The state representation employed by the state observer 18 is as follows:

gravity of the vehicle, m is the mass of the vehicle and $I_z$ is the moment of inertia of the vehicle.

The sideways control achieved via the closed loop 4 aims to minimize the state vector x about zero, this corresponding to a straight line. During cornering, the states $\psi_r$, $\dot{\psi}$ and $\delta$ must be corrected. The angle of the steering wheel and angle of the steered wheel are directly related via the power steering of the vehicle, which corresponds to a reduction ratio and to a rate of change of the second order. Thus, the angle $\delta$ is considered to correspond the angle of the steering wheel.

Figure 2:
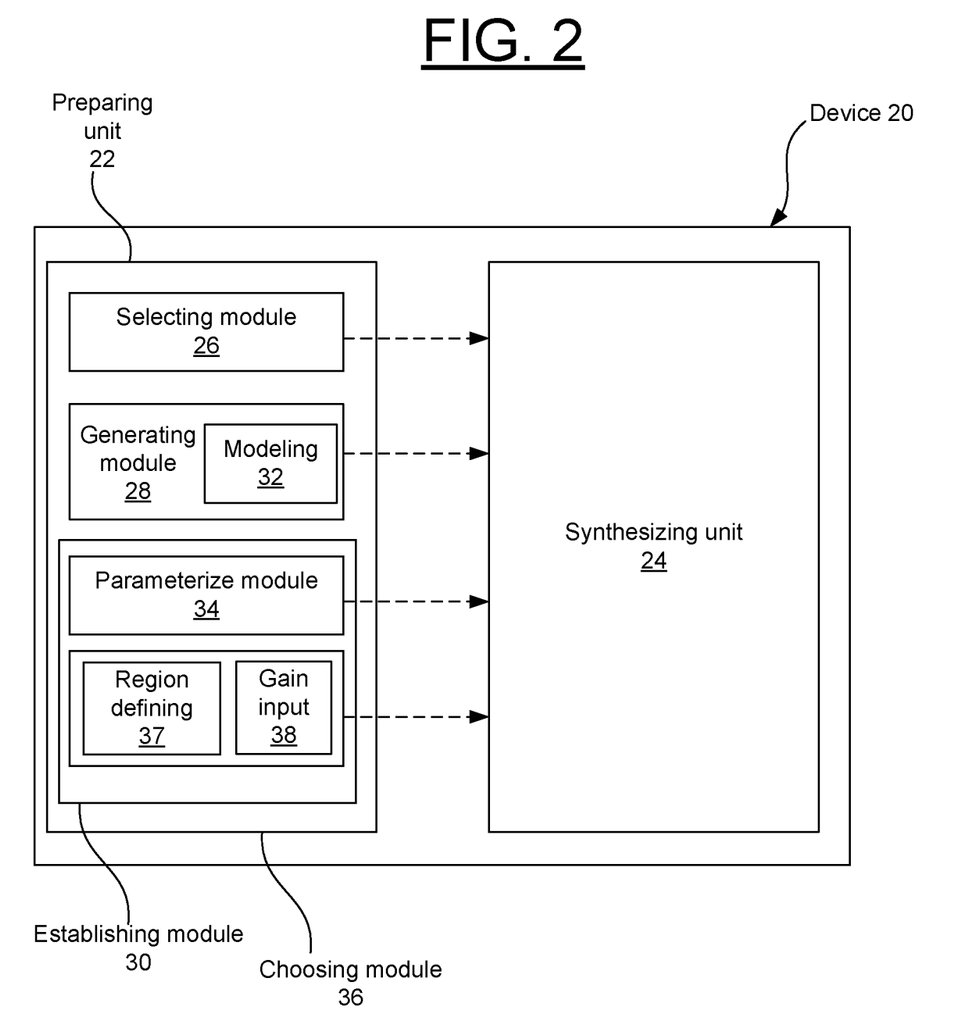

FIG. 2 schematically shows a device 20. The device 20 is intended to optimize the advanced driver-assistance system $$\frac{d}{dt}\underbrace{\begin{pmatrix} \dot{\psi} \\ \psi_{rel} \\ \dot{y}_L \\ y_L \\ \dot{\delta} \\ \delta \\ \int -y_L \end{pmatrix}}_{x} = \underbrace{\begin{pmatrix} -\frac{(C_f l_f^2 + C_r l_r^2)}{I_z v} & \frac{C_f l_f - C_r l_r}{I_z} & -\frac{(C_f l_f - C_r l_r)}{I_z v} & 0 & 0 & \frac{C_f l_f}{I_z} & 0 \\ 1 & 0 & 0 & 0 & 0 & 0 & 0 \\ \frac{C_f l_f - C_r l_r}{mv} & \frac{C_f + C_r}{m} & -\frac{(C_f + C_r)}{mv} & 0 & 0 & \frac{C_f}{m} & 0 \\ 0 & 0 & 1 & 0 & 0 & 0 & 0 \\ 0 & 0 & 0 & 0 & -2\zeta\omega & -\omega^2 & 0 \\ 0 & 0 & 0 & 0 & 1 & 0 & 0 \\ 0 & 0 & 0 & -1 & 0 & 0 & 0 \end{pmatrix}}_{A} \tag{1}$$

$$\underbrace{\begin{pmatrix} \dot{\psi} \\ \psi_{rel} \\ \dot{y}_L \\ y_L \\ \dot{\delta} \\ \delta \\ \int -y_L \end{pmatrix}}_{x} + \underbrace{\begin{pmatrix} 0 \\ 0 \\ 0 \\ 0 \\ \omega^2 \\ 0 \\ 0 \end{pmatrix}}_{B_\delta} \delta_{req,front} + \underbrace{\begin{pmatrix} 0 \\ -v \\ -v^2 \\ 0 \\ 0 \\ 0 \\ 0 \end{pmatrix}}_{B_\rho} \rho$$

$$\underbrace{\begin{pmatrix} \dot{\psi} \\ \psi_{rel} \\ y_L \\ \delta \\ \int -y_L \end{pmatrix}}_{V} = \underbrace{\begin{pmatrix} 1 & 0 & 0 & 0 & 0 & 0 & 0 \\ 0 & 1 & 0 & 0 & 0 & 0 & 0 \\ 0 & 0 & 0 & 1 & 0 & 0 & 0 \\ 0 & 0 & 0 & 0 & 0 & 1 & 0 \\ 0 & 0 & 0 & 0 & 0 & 0 & 1 \end{pmatrix}}_{C} \begin{pmatrix} \dot{\psi} \\ \psi_{rel} \\ \dot{y}_L \\ y_L \\ \dot{\delta} \\ \delta \\ \int -y_L \end{pmatrix} \tag{2}$$

where $C_f$ is the cornering stiffness of a front axle assembly of the vehicle, $C_r$ is the cornering stiffness of a rear axle assembly of the vehicle, $L_f$ is the distance between the front axle and the center of gravity of the vehicle, $L_r$ is the distance between the rear axle and the center of illustrated in FIG. 1. More particularly, the device 20 is intended to parameterize the controller 16 with a view to optimizing the closed loop 4 in order to meet the requirements of the advanced driver assistance delivered to the vehicle.

The device 20 comprises a preparing unit 22 and a synthesizing unit 24. The function of the unit 22 is to prepare an optimization problem the solution of which is a set of parameters for the corrector 16 that delivers the optimal characteristics of the closed loop 4. To this end, the unit 22 comprises a selecting module 26, a generating module 28 and an establishing module 30. The function of the unit 24 is to solve the optimization problem delivered by the unit 22, in order to find this solution.

The function of the module 26 is to select a family of bicycle models of the vehicle. The module 26 transmits the selected family to the unit 24, which solves the optimization problem using all the models of the transmitted family.

The function of the module 28 is to generate an environment model representative of a perturbation to which the advanced driver-assistance system is subject. In the present case, the perturbation is a curvature in the road. To this end, the module 28 comprises a means 32 for modelling a suitable transfer function. In the illustrated example, the means 32 establishes a third-order model of zero initial derivative. The module 28 is able to feed the model established by the means 32 with an irreducible signal such as white noise or a train of Dirac pulses. The signal delivered by the third-order model thus fed is an environment model that is transmitted to the unit 24 with a view to solving the optimization problem.

The module 30 is equipped with a parameterize module 34. The function of the module 34 is to generate an optimization criterion and an optimization constraint with a view to defining a basic constrained optimization problem.

The module 30 comprises a choosing module 36 the function of which is to generate an additional optimization constraint. The module 36 comprises a first means 37 for defining a region in a complex plane. The module 36 is equipped with a second means 38 for inputting a maximum gain value. The module 36 is able to express, in the form of an optimization constraint, the position of the poles of the corrector 16 in the region defined by the means 37. The module 36 is also able to express, in the form of an optimization constraint, the fact that the upper bound of the gain of the transfer function of the closed loop 4 is the value input into the means 38.

The optimization criterion and constraints generated by the modules 34 and 36 are respectively delivered to the unit 24 with a view to solving the optimization problem.

Figure 3:
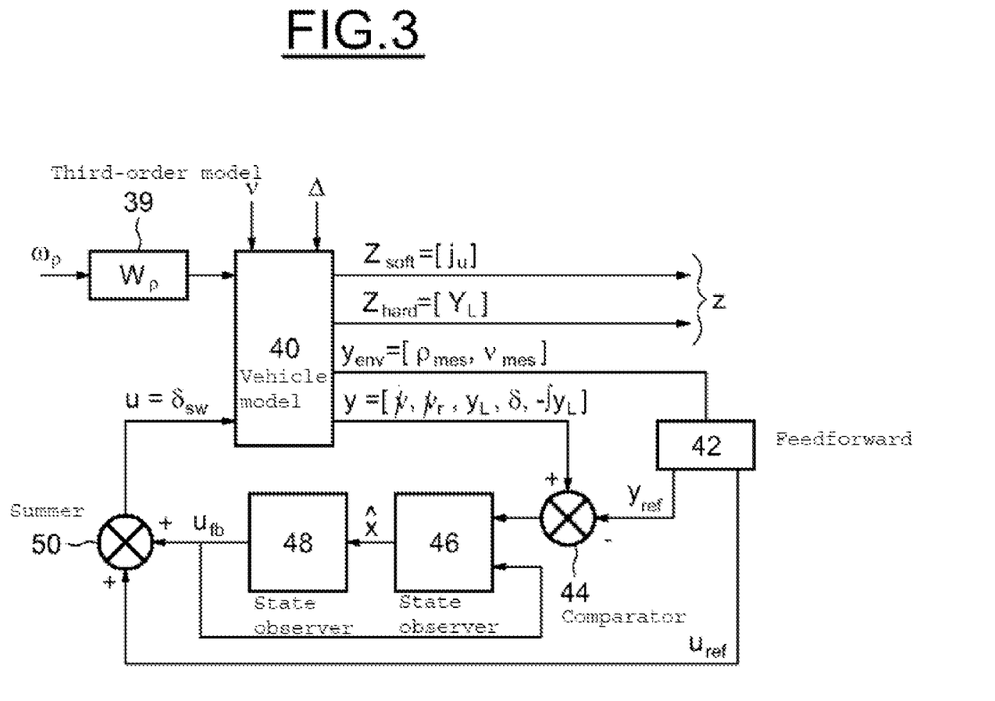
FIG. 3 is a block diagram illustrating the operation of the advanced driver-assistance system during an optimization implemented by means of the device of FIG. 2, FIG. 4 schematically illustrates an optimizing method according to another aspect of the invention.

In the block diagram of FIG. 3, the third-order model established by the means 32 has been represented by the block 39. The transfer function $W_\rho$ is a third-order model of zero initial derivative. The block 39 is fed with an irreducible signal $\omega_\rho$. The block 39 delivers as output a signal corresponding to the perturbation $\rho$, which is fed into the augmented vehicle model schematically shown by the block 40.

The block 40 delivers a measurement signal y resulting from measurement of parameters of the vehicle, and a measurement signal $y_{env}$ resulting from measurement of parameters of the environment. A block corresponding to the feedforward 12 receives the signal $y_{env}$ and generates a reference measurement signal $y_{ref}$ and a reference input control signal $u_{ref}$. The signal $y_{ref}$ is subtracted from the signal y by a comparator 44. The signal generated by the comparator 44 is delivered to 2 blocks 46 and 48 corresponding to the state observer 18. A summer 50 adds the closed-loop term $u_{fb}$ to the open-loop term $u_{ref}$.

Figure 4:
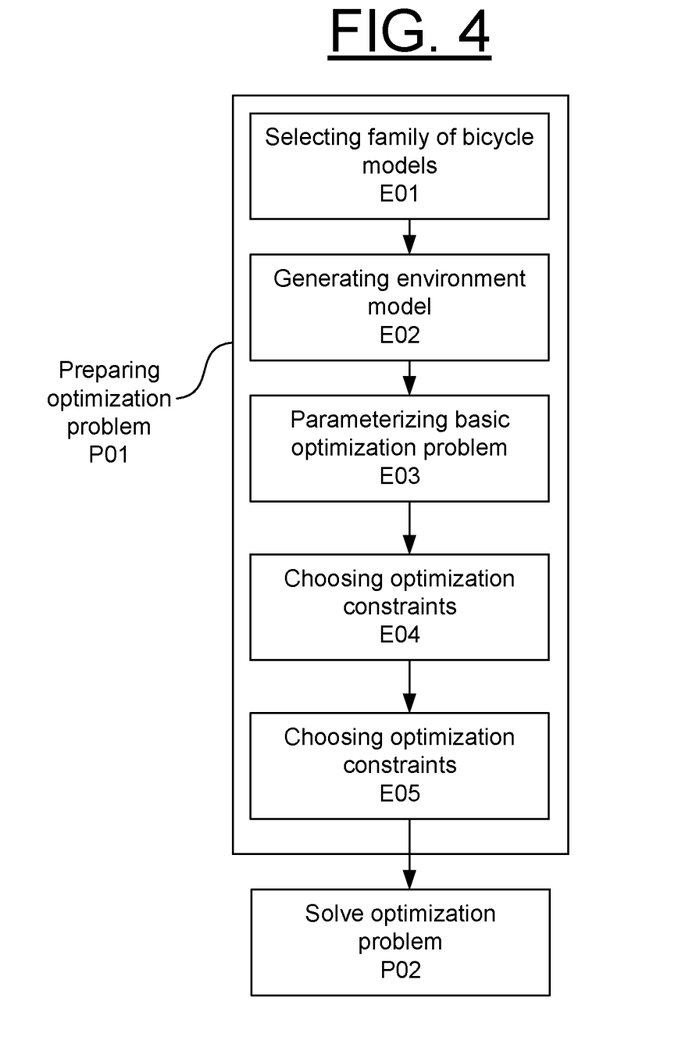

FIG. 4 schematically shows an optimizing method able to be implemented with the device 20 shown in FIG. 2. The method comprises a preparing first phase P01 and a synthesizing second phase P02.

The phase P01 comprises a step E01 of selecting a family of bicycle models of the vehicle. In step E01, the module 26 selects at least two bicycle models of the vehicle to form a family. A model is a set of parameters associated with a configuration of the vehicle. Irrespectively of the plurality of models, a dispersion in a parameter thereof corresponds to the existence of a difference in this parameter between at least two models of this plurality of models.

In order to use various models corresponding to different configurations of the vehicle, the models of the family have at least one dispersion chosen from a dispersion in the mass m, a dispersion in the stiffness $C_f$, a dispersion in the stiffness $C_r$, a dispersion in the position $L_f$, a dispersion in the position $L_r$ and a dispersion in the matrix 4.

In the illustrated example, the dispersion of the moment $I_z$ has been excluded. By excluding a dispersion, the considered number of models is decreased and hence the phase P02 of solving the problem is made easier. Nonetheless, since the moment $I_z$ varies relatively little between the various configurations of use of a given vehicle, the considered number of various configurations is not significantly decreased. As explained above, the assumption of invariance in the moment $I_z$ is especially valid in the case of a compact vehicle. However, the invention is not limited to this context. It is possible without departing from the scope of the invention to allow for a dispersion in the moment of inertia, especially in the case of a family vehicle, a utility vehicle or a truck.

Moreover, it is assumed that mass will only be added to the rear axle of the vehicle. Such an assumption is reasonable in so far as front passengers are located level with the center of mass, rear passengers being slightly in front of the rear axle and the trunk being behind the rear axle. Under these conditions, the distance $L_r$ can only decrease whereas the distance $L_f$ can only increase.

The equation relating the distance $L_f$ and the masses $M_f$ on the front axle and $M_r$ on the rear axle is the following:

$$L_f = \frac{M_r}{M_f + M_r} \cdot L_T$$

where $L_T$ is the wheelbase of the vehicle. Assuming the above assumption to be valid, this equation may be simplified in the following way:

$$L_f = \frac{m - M_f}{m} \cdot L_T = \left(1 - \frac{M_f}{m}\right) \cdot L_T$$

where $M_f$ and $L_T$ are constants.

Thus, the distance $L_f$ is directly related to the mass m. It is therefore possible to remove a degree of freedom of variation in the position $L_f$ or $L_r$ independently of the variation in mass m. The number of models considered is thus decreased without however significantly limiting the number of different configurations considered.

In the illustrated example, the mass m is considered to be able to vary between the mass $m_{nominal}$ of a vehicle loaded with two adult passengers and the total permitted loaded weight $m_{PTAC}$. The mass $m_{nominal}$ corresponds to the empty weight plus 160 kg. The mass $m_{PTAC}$ varies depending on the model of the vehicle. In the illustrated example, the problem is simplified by considering the mass m to vary between $m_{nominal}$ and $1.25 \times m_{nominal}$.

The stiffnesses $C_f$ and $C_r$ are related to the variation in the stiffnesses of the tires with which the front and rear axle assemblies are equipped. The stiffness of a tire is related to a high number of parameters comprising the load of the vehicle, temperature, inflation, size, geometry, steering angle and aging of the tires. To allow for the stiffness of the tires of the vehicle, the stiffness of an axle assembly of the vehicle will be considered to be able to vary between −30% and +30% with respect to a nominal axle-assembly stiffness $C_{f,nominal}$ or $C_{r,nominal}$.

Thus, in the illustrated example, the selected models exhibit a dispersion chosen from a dispersion in the mass m, a dispersion in the stiffness $C_f$ and a dispersion in the stiffness $C_r$. It is possible to further decrease the number of models by selecting models that preserve the understeer character of the vehicle. The oversteer character of the vehicle is evaluated via the positive sign of the bend gradient defined by the expression:

$$\nabla_{SG} = \frac{m \cdot (C_r \cdot L_r - C_f \cdot L_f)}{L_{tot} \cdot C_r \cdot C_f}.$$

Models representing the maximum observed variations in the parameters of the bicycle model are selected. Thus, five models, which are summarized in the following table, are considered:

| $\Sigma_{nominal}$ | m<br>$m_{nominal}$ | $C_f$<br>$C_{f,\,nominal}$ | $C_r$<br>$C_{r,\,nominal}$ |
|---|---|---|---|
| $\Sigma_{alt1}$ | $M_{nominal}$ | $0.7 \times C_{f,\,nominal}$ | $0.7 \times C_{r,\,nominal}$ |
| $\Sigma_{alt2}$ | $M_{nominal}$ | $1.3 \times C_{f,\,nominal}$ | $1.3 \times C_{r,\,nominal}$ |
| $\Sigma_{alt3}$ | $1.25 \times m_{nominal}$ | $0.7 \times C_{f,\,nominal}$ | $1.3 \times C_{r,\,nominal}$ |
| $\Sigma_{alt5}$ | $1.25 \times m_{nominal}$ | $C_{f,\,nominal}$ | $1.3 \times C_{r,\,nominal}$ |

Phase P01 comprises a step E02 of generating an environment model. In step E02, the means 32 generates the third-order model $W_\rho$ of zero initial derivative:

$$w_\rho = \frac{\rho}{\omega_\rho} = \frac{K}{(1+\tau \cdot s) \cdot \left(\frac{s^2}{\omega_0^2} + \frac{2 \cdot \xi}{\omega_0} \cdot s + 1\right)}$$

The module 28 feeds the model $W_\rho$ with an irreducible signal $\omega_\rho$. On so doing, a signal representative of a perturbation, in the present case the curvature $\rho$ of the road, is generated. The signal $\rho$ will be used by the optimization to predict and anticipate changes to the {vehicle-road} system, this improving the overall behavior by adding realism and therefore decreasing conservatism.

Because an irreducible signal $\omega_\rho$ is provided as input to the model $W_\rho$, the norm $\mathcal{L}_2$ of the output signal $\rho$ is directly related to the norm $\mathcal{H}_2$ of the transfer function $W_\rho$. Thus, a physical characteristic, in the present case the energy of a signal, is related to a norm of a transfer function.

The phase P01 comprises a step E03 of parameterizing the basic optimization problem. The basic optimization problem is a constrained optimization problem. Thus, in step E03, an optimization criterion and one or more optimization constraints are determined.

Sideways control with a view to remaining at the center of a traffic lane is comfort-related advanced driver assistance. In other words, the aim of this assistance is to help the driver while ensuring maximum comfort in order to maximize acceptance of this assistance by the driver. To maximize comfort, it is sought to minimize jerkiness in the angle of the steering wheel. On so doing, jerks in the steering wheel are minimized and continuous control similar to the behavior of a human driver is obtained. The minimization of the signal $j_u$ representing jerkiness corresponds to the minimization of its energy, and therefore of its norm $\mathcal{L}_2$, and thus to the minimization of the norm of the transfer function $\|T_{\omega_\rho \to j_u}\|_2$ relating the input of the block 39 to the output of the block 40 (see FIG. 3).

The advanced driver assistance delivered to the vehicle must meet a minimum performance requirement corresponding to a low lateral deviation A. To ensure a low deviation, $y_L$ it is necessary to ensure that the energy of the signal $y_L$ is lower than a value $k_\rho$ designating the targeted performance level. In other words, the lower the value $k_\rho$, the lower the deviation $y_L$ will be. The energy of the signal A is expressed by the norm of the transfer function $\|T_{\omega_\rho \to y_L}\|_2$.

In the illustrated example, the advanced driver assistance must also be robust in spite of uncertainty in the behavior of the power steering of the vehicle. Specifically, the power steering of a vehicle is generally supplied as a black box by a supplier to the manufacturer of the motor vehicle. It is thus difficult to identify the control law of the power steering. To ensure robustness in spite of the uncertainty in the behavior of the power steering and to ensure good stability properties, an optimization constraint that places a lower bound on the modulus input margin is parameterized via a minimum term $k_m$. This margin is directly related to the peak of the sensitivity function $S_u(s)$ of the closed loop 4. More precisely, the modulus margin is defined as the inverse of the resonant peak of the function $S_u(s)$, i.e. the inverse of the norm $\mathcal{H}_\infty$ of the function $S_u(s)$.

In light of the above, the module 34 parameterizes, in step E03, an optimization criterion and two optimization constraints, this being writable as follows:

$$\text{Minimize } \max \|T_{w_\rho \to j_u}\|_2$$

$$\text{Under constraints} : \begin{cases} \max \|T_{w_\rho \to y_L}\|_2 < k_\rho \\ \min \|S_u(s)\|_\infty^{-1} > k_m \end{cases}.$$

The phase P01 comprises two steps E04 and E05 of choosing additional optimization constraints.

Figure 5:
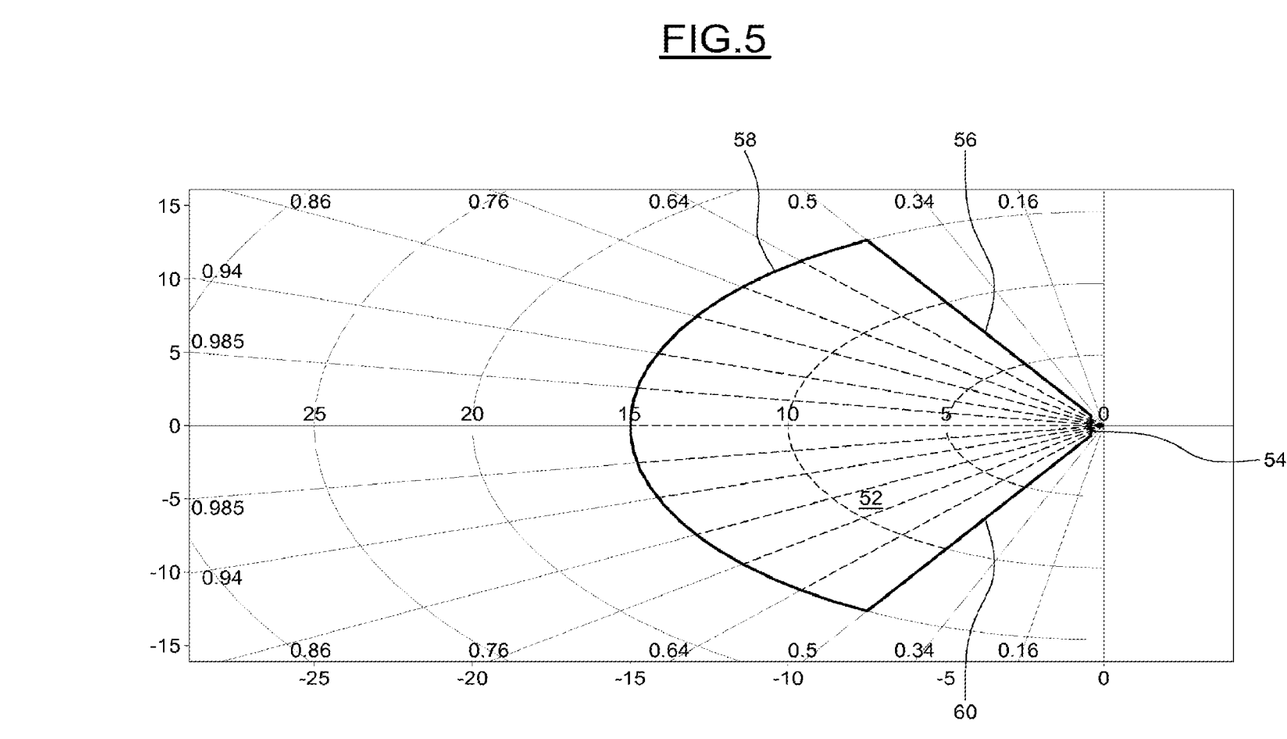
FIG. 5 is a graphical representation of a region of the complex plane used to define an optimization constraint in the method of FIG. 4.

In step E04, the means 37 defines, in the complex plane, a region such as the region 52 shown in FIG. 5. The region 52 is defined between a vertical straight line 54, a first oblique line 56, an elliptical section 58 and a second oblique line 60. Again in step E04, the module 36 expresses, in the form of an optimization constraint, the fact that the poles of the corrector 16 belongs to the region 52.

No matter what the complex number z belonging to the region 52, the point comprises a real part RE(z) lower than the ordinate minDecay of the vertical line 54. In other words, the region 52 is located to the left, with respect to the representation of FIG. 5, of the vertical line 54. The ordinate minDecay is representative of the slowest rate of change of the closed loop 4. By setting the line 54 as a right-hand limit of the region 52, a lower bound is placed on the rate of change of the closed loop 4. In other words, the closed loop 4 is thus made to have a minimum rate change equal to the minimum rate of change associated with the ordinate minDecay.

The lines 56 and 60 are symmetric with respect to the real axis. More precisely, the lines 56 and 60 form part of two straight lines passing through the origin of the complex coordinate system and make an angle θ to the real axis. In the illustrated example, the angle θ is substantially equal to 45°. By placing the region 52 between the lines 56 and 60, the damping coefficient of the controller 16 is adjusted so as to place a lower bound on the damping of the closed loop 4, via a minimum damping coefficient minDamping.

The elliptical section 58 is a level curve of the modulus corresponding to a maximum modulus maxFrequency. By placing the region 52 inside the section 58, an upper bound is placed on the amplitude of high-frequency vibrations in the closed loop 4.

In step E05, a maximum value $G_{max}$ of a gain of the transfer function of the closed loop 4 is input into the means 38. The module 36 then expresses, in the form of an additional optimization constraint, the fact that the gain of the transfer function of the closed loop 4 must be lower than the value $G_{max}$.

At the end of phase P01, a family consisting of a plurality of models representative of the vehicle, a model representative of the environment of the vehicle and a constrained optimization problem defined by an optimization criterion and optimization constraints are obtained. Although steps E01 to E05 have been presented in one particular order, it is possible, without departing from the scope of the invention, to envision inverting the order of any number of these steps.

In phase P02, the optimization problem based on the optimization criterion and the optimization constraints established in steps E03, E04 and E05 is solved. The optimization problem is solved taking into account the environment model generated in step E02 and taking into account each of the models selected in step E01.

By solving the optimization problem for each of the five selected modules, a single controller is found that allows a uniform and consistent behavior to be obtained in very diverse vehicle configurations. The proposed environment model and the optimization criterion and constraints are particularly apt to promote efficient solution of the problem and to lead to a solution that meets the requirements of the advanced driver assistance that must be delivered to the vehicle. Thus, the robustness of the delivered advanced driver assistance is increased without significantly increasing computational complexity.

The invention claimed is:

1. A method for optimizing a closed control loop of an advanced driver-assistance system to sideways control a vehicle, comprising:
   synthesizing, via processing circuitry, a controller of the closed control loop by solving an optimization problem for a family of at least two bicycle models of the vehicle, the optimization problem being constrained to minimize a first norm representing a first energy of a first transfer function between an input signal used to generate a perturbation signal representing a road curvature and an output signal representing a change in an angle of a steering wheel,
   each of the at least two bicycle models of the vehicle having, with respect to another of the at least two bicycle models, at least one dispersion chosen from a dispersion in a mass of the vehicle, a dispersion in a cornering stiffness of an axle assembly of the vehicle, a dispersion in a position of a center of gravity of the vehicle, and a dispersion in a moment of inertia of the vehicle; and
   generating, via the processing circuitry, a vehicle control output signal to control the vehicle based on a closed loop transfer function controlled by the synthesized controller.

2. The method as claimed in claim 1, wherein each of the at least two bicycle models has, with respect to another of the at least two bicycle models, at least one dispersion chosen from the dispersion in the mass of the vehicle, a dispersion in the cornering stiffness of a front axle assembly of the vehicle, and a dispersion in the cornering stiffness of a rear axle assembly of the vehicle.

3. The method as claimed in claim 1, wherein the family comprises a nominal bicycle model corresponding to a configuration of the vehicle transporting exactly two passengers present in a front of the vehicle, the nominal bicycle model employing a nominal mass of the vehicle, a nominal cornering stiffness of a front axle assembly of the vehicle, and a nominal cornering stiffness of a rear axle assembly of the vehicle, the family furthermore comprising at least one alternative bicycle model chosen from:
   a first alternative bicycle model employing a first mass of the vehicle equal to the nominal mass of the vehicle, a first cornering stiffness of the front axle assembly higher than the nominal cornering stiffness of the front axle assembly, and a first cornering stiffness of the rear axle assembly higher than the nominal cornering stiffness of the rear axle assembly,
   a second alternative bicycle model employing a second mass of the vehicle equal to the nominal mass of the vehicle, a second cornering stiffness of the front axle assembly lower than the nominal cornering stiffness of the front axle assembly, and a second cornering stiffness of the rear axle assembly lower than the nominal cornering stiffness of the rear axle assembly,
   a third alternative bicycle model employing a third mass of the vehicle higher than the nominal mass of the vehicle, a third cornering stiffness of the front axle assembly lower than the nominal cornering stiffness of the front axle assembly, and a third cornering stiffness of the rear axle assembly higher than the nominal cornering stiffness of the rear axle assembly, and
   a fourth alternative bicycle model employing a fourth mass of the vehicle higher than the nominal mass of the vehicle, a fourth cornering stiffness of the front axle assembly equal to the nominal cornering stiffness of the front axle assembly, and a fourth cornering stiffness of the rear axle assembly higher than the nominal cornering stiffness of the rear axle assembly.

4. The method as claimed in claim 1, further comprising:
   modeling the road curvature using a third-order model with a zero initial derivative;
   generating an environment model inputting the input signal to the third-order model; and
   solving the optimization problem using the generated environment model.

5. The method as claimed in claim 4, wherein the solving the optimization problem further comprises respecting at least one constraint chosen from:
   a first constraint taking a form of an upper bound on a norm of a second transfer function between the input signal and a sideways deviation of a center of gravity of the vehicle with respect to a center of a traffic lane of a roadway, and a second constraint taking a form of a lower bound on an inverse of a norm of a sensitivity function of the advanced driver-assistance system.

6. The method as claimed in claim 1, further comprising:

defining, via the processing circuitry, a region of a complex plane between a maximum real part, two straight half-lines originating at an origin and making a geometric angle to a real axis and a level curve of a modulus; and solving the optimization problem such that, for each bicycle model belonging to the family, poles of the controller are located in said region.

7. The method as claimed in claim 1, further comprising:

receiving, via the processing circuitry, a maximum value of a gain of the closed loop transfer function; and solving the optimization problem when the maximum value is an upper bound of the gain of the closed loop transfer function.

8. The method as claimed in claim 1, wherein the closed control loop is part of an advanced driver-assistance system to center the vehicle in a traffic lane.

9. The method as claimed in claim 1, wherein the generating the vehicle control output signal is further based on a state representation of a movement of the vehicle.

10. The method as claimed in claim 1, further comprising controlling a steering wheel of the vehicle based on the vehicle control output signal.

11. The method as claimed in claim 1, wherein the input signal used to generate the perturbation signal representing the road curvature is a white noise signal or a train of Dirac pulses.

12. A device for optimizing a closed control loop of an advanced driver-assistance system for sideways control of a vehicle, comprising:

processing circuitry configured to synthesize a controller of the closed control loop by solving an optimization problem for a family of at least two bicycle models of the vehicle, each of the at least two bicycle models having, with respect to another of the at least two bicycle models, at least one dispersion chosen from a dispersion in a mass of the vehicle, a dispersion in a cornering stiffness of an axle assembly of the vehicle, a dispersion in a position of a center of gravity of the vehicle, and a dispersion in a moment of inertia of the vehicle, wherein the optimization problem is constrained to minimize a first norm representing a first energy of a first transfer function between an input signal used to generate a perturbation signal representing a road curvature and an output signal representing a change in an angle of a steering wheel, and generate a vehicle control output signal to control the vehicle based on a closed loop transfer function controlled by the synthesized controller.

13. A non-transitory computer-readable storage medium for storing computer-readable instructions that, when executed by a computer, cause the computer to perform a method, the method comprising:

synthesizing a controller of a closed control loop of an advanced driver-assistance system to sideways control a vehicle by solving an optimization problem for a family of at least two bicycle models of the vehicle, each of the at least two bicycle models of the vehicle having, with respect to another of the at least two bicycle models, at least one dispersion chosen from a dispersion in a mass of the vehicle, a dispersion in a cornering stiffness of an axle assembly of the vehicle, a dispersion in a position of a center of gravity of the vehicle, and a dispersion in a moment of inertia of the vehicle, wherein the optimization problem is constrained to minimize a first norm representing a first energy of a first transfer function between an input signal used to generate a perturbation signal representing a road curvature and an output signal representing a change in an angle of a steering wheel; and generating a vehicle control output signal to control the vehicle based on a closed loop transfer function controlled by the synthesized controller.

\* \* \* \* \*